United States Patent
Mane

(10) Patent No.: US 12,120,178 B2
(45) Date of Patent: Oct. 15, 2024

(54) ALLOWING A NETWORK FILE SYSTEM (NFS) CLIENT INFORMATION HANDLING SYSTEM MORE THAN ONE SESSION IN PARALLEL OVER A SAME NETWORK INTERFACE CARD (NIC)

(71) Applicant: DELL PRODUCTS L.P., Round Rock, TX (US)

(72) Inventor: Suhas Dattatray Mane, Maharashtra (IN)

(73) Assignee: DELL PRODUCTS L.P., Round Rock, TX (US)

( * ) Notice: Subject to any disclaimer, the term of this patent is extended or adjusted under 35 U.S.C. 154(b) by 0 days.

(21) Appl. No.: 17/970,442

(22) Filed: Oct. 20, 2022

(65) Prior Publication Data
US 2024/0137413 A1  Apr. 25, 2024
US 2024/0236181 A9  Jul. 11, 2024

(51) Int. Cl.
*H04L 67/1097* (2022.01)
*H04L 67/141* (2022.01)

(52) U.S. Cl.
CPC ........ *H04L 67/1097* (2013.01); *H04L 67/141* (2013.01)

(58) Field of Classification Search
CPC .......................... H04L 67/1097; H04L 67/141
USPC ......................................................... 709/217
See application file for complete search history.

(56) References Cited

U.S. PATENT DOCUMENTS

| | | | |
|---|---|---|---|
| 2002/0059309 A1* | 5/2002 | Loy ......................... | G06F 9/542 707/999.009 |
| 2014/0164447 A1* | 6/2014 | Tarafdar ................ | G06F 16/182 707/827 |
| 2017/0134357 A1* | 5/2017 | Ohlsson .................. | H04L 63/08 |
| 2017/0171220 A1* | 6/2017 | Thomson .............. | H04L 63/105 |
| 2017/0264634 A1* | 9/2017 | Carter ................... | H04L 63/102 |

OTHER PUBLICATIONS

Shepler, et al., "Network File System (NFS) Version 4 Minor Version 1 Protocol," Internet Engineering Task Force (IETF), Jan. 2010.
[online], [Retrieved Oct. 23, 2022]. Retrieved from Internet <URL:https://www.rfc-editor.org/rfc/rfc5661> (617pgs).

* cited by examiner

*Primary Examiner* — Suraj M Joshi
(74) *Attorney, Agent, or Firm* — BAUGH LAW, LLC

(57) ABSTRACT

With introduction of RDMA (Remote Data Memory Access) NICs (Network Interface Cards), it may be desirable for a client device to be able to use TCP (Transmission Control Protocol) and RDMA transports over a same RDMA NIC/IP. However, current systems do not support connections with different transport protocols from the RDMA NIC/IP. Accordingly, to solve this issue, embodiments allow a client to use different transports from the same RDMA NIC-IP in parallel. In one or more embodiments, a transport type (e.g., TCP or RDMA) may be added to or embedded in one or more identifiers thereby allowing a client to use an intended transport over a same NIC.

20 Claims, 16 Drawing Sheets

_600_

ALLOWING A NETWORK FILE SYSTEM (NFS) CLIENT INFORMATION HANDLING SYSTEM MORE THAN ONE SESSION IN PARALLEL OVER A SAME NETWORK INTERFACE CARD (NIC)

BACKGROUND

A. Technical Field

The present disclosure relates generally to information handling system. More particularly, the present disclosure relates to network file systems.

B. Background

As the value and use of information continues to increase, individuals and businesses seek additional ways to process and store information. One option available to users is information handling systems. An information handling system generally processes, compiles, stores, and/or communicates information or data for business, personal, or other purposes thereby allowing users to take advantage of the value of the information. Because technology and information handling needs and requirements vary between different users or applications, information handling systems may also vary regarding what information is handled, how the information is handled, how much information is processed, stored, or communicated, and how quickly and efficiently the information may be processed, stored, or communicated. The variations in information handling systems allow for information handling systems to be general or configured for a specific user or specific use, such as financial transaction processing, airline reservations, enterprise data storage, or global communications. In addition, information handling systems may include a variety of hardware and software components that may be configured to process, store, and communicate information and may include one or more computer systems, data storage systems, and networking systems.

With introduction of remote direct memory access (RDMA) network interface cards (NICs) to network file system (NFS) information handling system, a NFS client should be able to use Transmission Control Protocol (TCP) and RDMA transports over the same RDMA NIC/IP.

A commonly used protocol is the Network File System (NFS), which is a distributed file system protocol that allows a client information handling system to access files over a network that are stored at a remote information handling system. The NFS protocol is an open Internet Engineering Task Force (IETF) standard defined in a Request for Comments (RFC). However, the current protocol version, NFS version 4.1 (denoted as NFSv4.1) does not allow for concurrent TCP mount and RDMA mount on the same NFS client. Rather, the client uses the transport type (whether TCP or RDMA) that is first mounted with the NFS server. Therefore, the NFS client is not allowed to use RDMA transport if TCP is used for the first mount and vice versa if RDMA is used for the first mount.

Accordingly, it is highly desirable to have means that support the use of different transports via the same NIC or port.

BRIEF DESCRIPTION OF THE DRAWINGS

References will be made to embodiments of the disclosure, examples of which may be illustrated in the accompanying figures. These figures are intended to be illustrative, not limiting. Although the accompanying disclosure is generally described in the context of these embodiments, it should be understood that it is not intended to limit the scope of the disclosure to these particular embodiments. Items in the figures may not be to scale.

DETAILED DESCRIPTION OF EMBODIMENTS

Figure 1A:
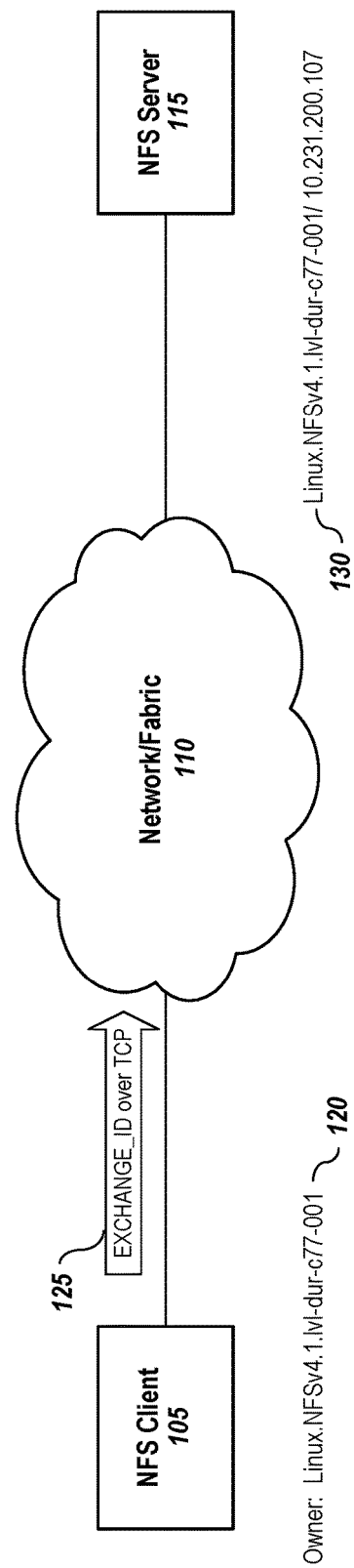
FIGS. 1A-1D depict typical exchange for mounting a network file system (NFS) share.

In the following description, for purposes of explanation, specific details are set forth in order to provide an understanding of the disclosure. It will be apparent, however, to one skilled in the art that the disclosure can be practiced without these details. Furthermore, one skilled in the art will recognize that embodiments of the present disclosure, described below, may be implemented in a variety of ways, such as a process, an apparatus, a system/device, or a method on a tangible computer-readable medium.

Components, or modules, shown in diagrams are illustrative of exemplary embodiments of the disclosure and are meant to avoid obscuring the disclosure. It shall be understood that throughout this discussion that components may be described as separate functional units, which may comprise sub-units, but those skilled in the art will recognize that various components, or portions thereof, may be divided into separate components or may be integrated together, including, for example, being in a single system or component. It should be noted that functions or operations discussed herein may be implemented as components. Components may be implemented in software, hardware, or a combination thereof.

Furthermore, connections between components or systems within the figures are not intended to be limited to direct connections. Rather, data between these components may be modified, re-formatted, or otherwise changed by intermediary components. Also, additional or fewer connections may be used. It shall also be noted that the terms "coupled," "connected," "communicatively coupled," "interfacing," "interface," or any of their derivatives shall be understood to include direct connections, indirect connections through one or more intermediary devices, and wireless connections. It shall also be noted that any communication, such as a signal, response, reply, acknowledgement, message, query, etc., may comprise one or more exchanges of information.

Reference in the specification to "one or more embodiments," "preferred embodiment," "an embodiment," "embodiments," or the like means that a particular feature, structure, characteristic, or function described in connection with the embodiment is included in at least one embodiment of the disclosure and may be in more than one embodiment. Also, the appearances of the above-noted phrases in various places in the specification are not necessarily all referring to the same embodiment or embodiments.

The use of certain terms in various places in the specification is for illustration and should not be construed as limiting. The terms "include," "including," "comprise," "comprising," and any of their variants shall be understood to be open terms, and any examples or lists of items are provided by way of illustration and shall not be used to limit the scope of this disclosure.

A service, function, or resource is not limited to a single service, function, or resource; usage of these terms may refer to a grouping of related services, functions, or resources, which may be distributed or aggregated. The use of memory, database, information base, data store, tables, hardware, cache, and the like may be used herein to refer to system component or components into which information may be entered or otherwise recorded. The terms "data," "information," along with similar terms, may be replaced by other terminologies referring to a group of one or more bits, and may be used interchangeably. The terms "packet" or "frame" shall be understood to mean a group of one or more bits. The term "frame" shall not be interpreted as limiting embodiments of the present invention to Layer 2 networks; and, the term "packet" shall not be interpreted as limiting embodiments of the present invention to Layer 3 networks. The terms "packet," "frame," "data," or "data traffic" may be replaced by other terminologies referring to a group of bits, such as "datagram" or "cell."

It shall be noted that: (1) certain steps may optionally be performed; (2) steps may not be limited to the specific order set forth herein; (3) certain steps may be performed in different orders; and (4) certain steps may be done concurrently.

Any headings used herein are for organizational purposes only and shall not be used to limit the scope of the description or the claims. Each reference/document mentioned in this patent document is incorporated by reference herein in its entirety.

It shall be noted that any experiments and results provided herein are provided by way of illustration and were performed under specific conditions using a specific embodiment or embodiments; accordingly, neither these experiments nor their results shall be used to limit the scope of the disclosure of the current patent document.

It shall also be noted that although embodiments described herein may be within the context of Network File System protocol, aspects of the present disclosure are not so limited. Accordingly, the aspects of the present disclosure may be applied or adapted for use in other contexts.

A. General Background

As noted above, currently, such as under the Network File System 4.x protocol, a client device cannot mount a NFS share over TCP and RDMA transports targeting same server endpoint. Consider an NFS4.x server that has one RDMA network interface card (NIC). Assume that a NFSv4.1 client information handling system/device mounts an NFS share over TCP using RDMA NIC-IP (Internet Protocol). Note that mount information at the NFS client device may show that TCP is the underlying transport/protocol.

Now consider another mount from the same NFSv4.1 client device using RDMA transport and targeting the same server. Currently, the NFS client device again uses the same session with same transport (i.e., TCP) instead of RDMA— thus, the mount information at the NFS client device shows again TCP as transport/protocol. Thus, the second mount attempt does not allow the client device to utilize RDMA capabilities.

Note that if the first mount was an RDMA mount, and the client then tried to establish a TCP mount, the same issue would occur except the transport would be considered RDMA. Therefore, in this scenario, the client device cannot utilize TCP transport over the RDMA NIC.

FIGS. 1A-1D graphically illustrate this issue. The figures depict typical EXCHANGE_ID exchanges of long-hand client and server identifiers (owners), and the creation of a client identifier (ID).

Figure 1B:
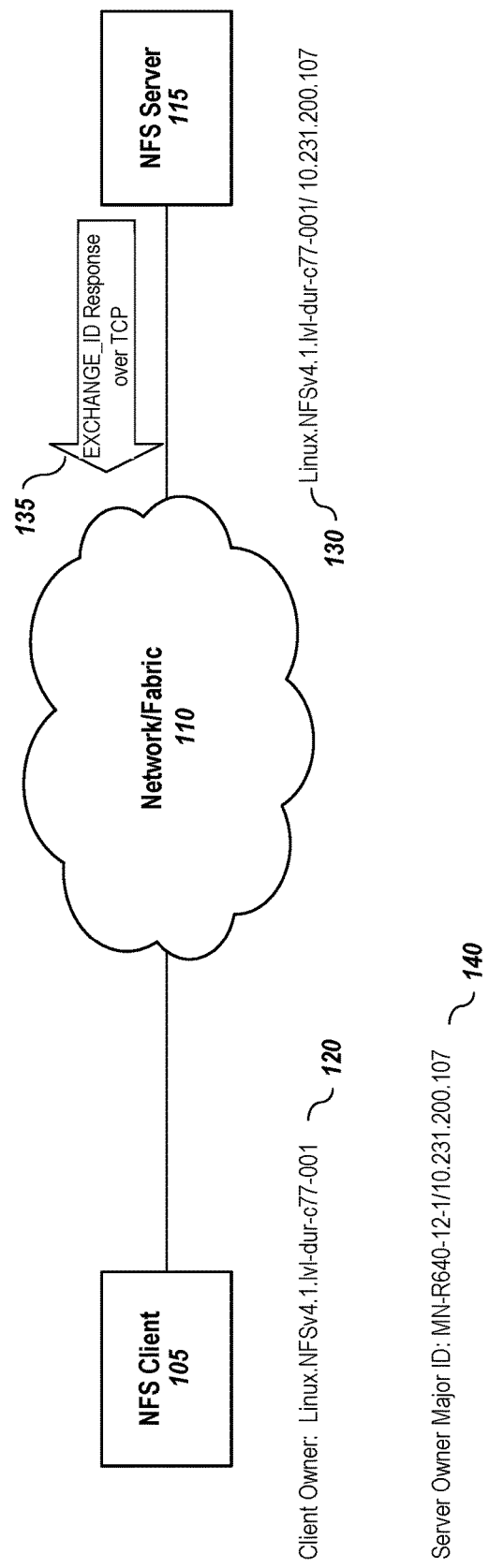

FIGS. 1A and 1B depict a TCP mount using a typical NFSv4.1 protocol methodology. As shown in FIG. 1A, the client device 105 sends 125 a client owner value as part of EXCHANGE_ID operation 125, which is sent over a network/fabric 110 to the NFS server 115 using a TCP protocol. Linux may compose the client owner value as: Linux.<NFS-version>.<client_name>; in the depicted example, it is Linux.NFSv4.1.1v1-dur-c77-001 120. The server 115 receives the EXCHANGE_ID communication, and the NFS server stores the client owner as a client long-name, which may be of the format <Client-Owner> along with Server IP Address. In example, the stored client long-name is Linux.NFSv4.1.1v1-dur-c77-001/10.231.200.107 130.

Turning now to FIG. 1B, the NFS server 115 responds to EXCHANGE_ID request with an Exchange_ID response 135 that includes a server owner major ID, which may be of the format: <NodeUniqueID/Server_IP_address>. In the depicted example, the server owner major ID is MN-R640-12-1/10.231.200.107 140. After the processes depicted in FIGS. 1A and 1B, the client device sees a TCP mount in its mount information.

Figure 1C:
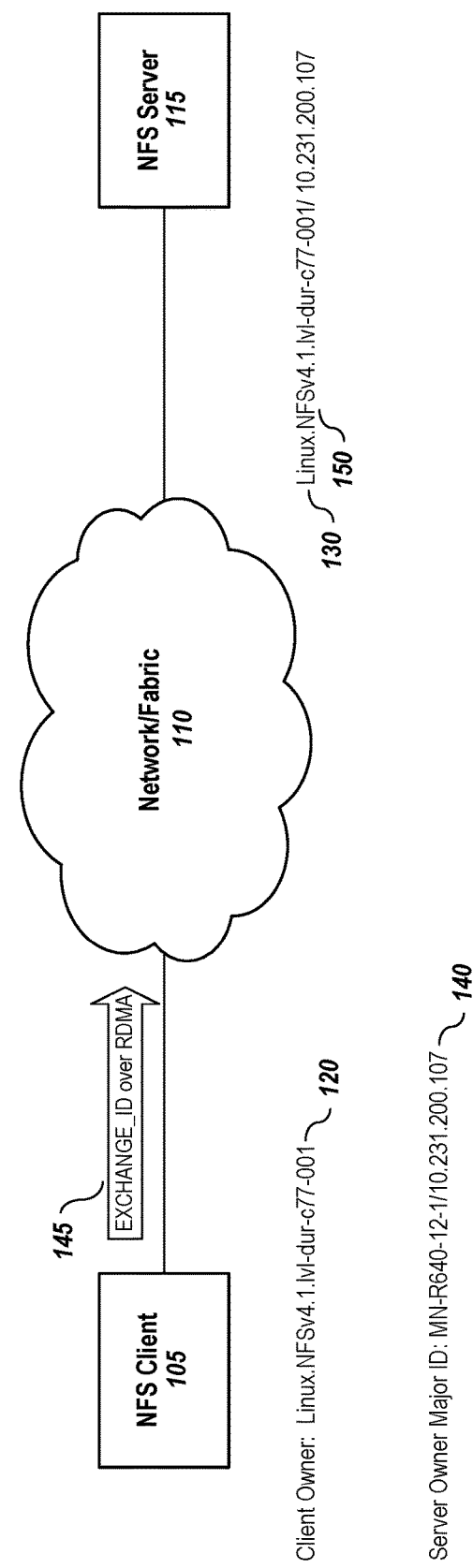
Figure 1D:
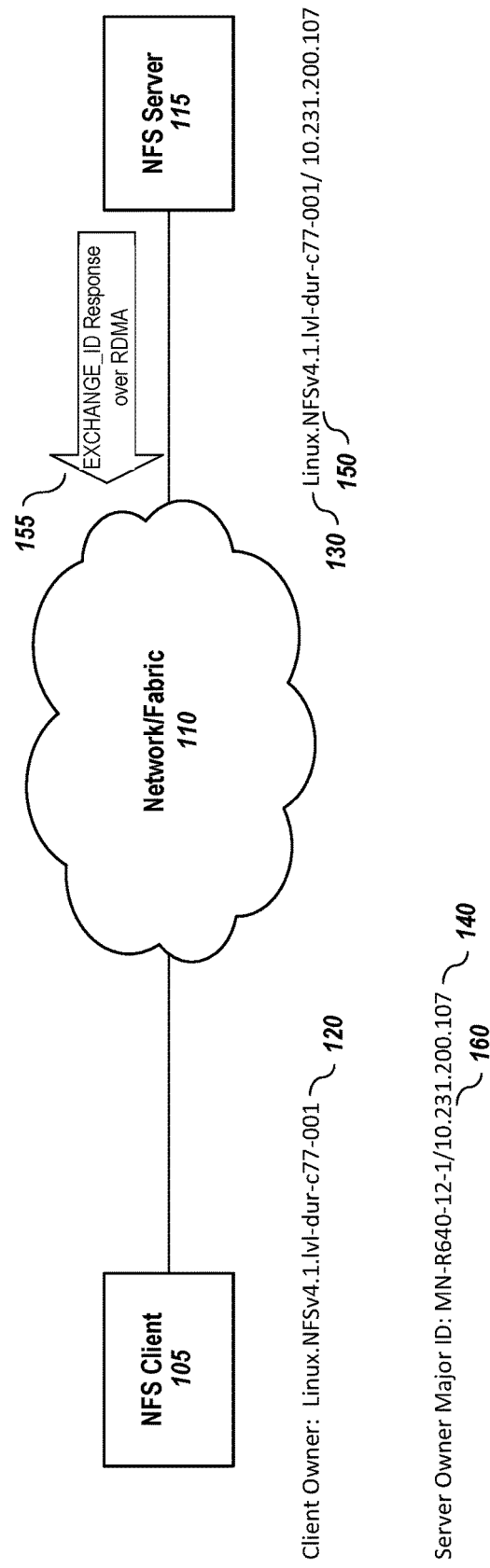

Now consider that the client device wants to have an RDMA mount from the same port/NIC using NFS protocol. This process is depicted in FIGS. 1C and 1D. Note that process depicted in FIG. 1C is the same as in FIG. 1A except the communication 145 is over an RDMA protocol. Note that the client long-name 150 is the same as in FIG. 1A because the core values are the same.

As illustrated in FIG. 1D, the server's response 155 to the EXCHANGE_ID request, which includes a server owner major ID, is the same as in FIG. 1D with the exception that it is over RDMA. In the depicted example, the server owner major ID is MN-R640-12-1/10.231.200.107 160, which is the same as in FIG. 1B for the TCP exchange. After the processes depicted in FIGS. 1C and 1D, the client device sees another (or what might appear to be the same) TCP mount in its mount information. Note that in the exchanges there was no express noting of the underlying transport.

If one were to look at the mount information of the client 105, the following would be found (but recall that the first mount used TCP and the subsequent mount used RDMA):

root@lvl-dur-c77-001:~#mount -t nfs -o nfsvers=4.1, proto=tcp 10.231.200.107:/ifs/dataitcpdata/tmp/smane/ tcpdata
root@lvl-dur-c77-001:~#mount|grep 10.231.200.107
10.231.200.107 lifs/data/tcpdata on /tmp/smane/tcpdata type nfs4 (rw,relatime,vers=4.1,rsize=1047672, wsize=1047532,namlen=255,hard,proto=tcp,timeo=600,ret rans=2,sec=sys,clientaddr=10.219.38.241,local_lock=none, addr=10.231.200.107)
root@lvl-dur-c77-001:~#mount -t nfs -o nfsvers=4.1, proto=rdma 10.231.200.107:/ifs/datairdmadata/tmp/ smane/rdmadata
root@lvl-dur-c77-001:~#mount|grep 10.231.200.107

10.231.200.107 lifs/data/tcpdata on /tmp/smane/tcpdata type nfs4 (rw,relatime,vers=4.1,rsize=1047672, wsize=1047532,namlen=255,hard,proto=tcp, timeo=600,re trans=2,sec=sys,clientaddr=10.219.38.241,local_lock=none, addr=10.231.200.107)

10.231.200.107:/ifs/data/rdmadata on /tmp/smane/rdmadata type nfs4 (rw,relatime,vers=4.1,rsize=1047672, wsize=1047532,namlen=255,hard,proto=tcp, timeo=600,ret rans=2,sec=sys, clientaddr=10.219.38.241,local_lock=none, addr=10.231.200.107)

Note that the bold and italics text shows the second mount is also using TCP as transport (rather than RDMA as it should), which is not allowing the client to use intended transport.

One approach to addressing this issue may be to assign multiple IP addresses to this single RDMA NIC and let the client use different IPs for different transports (e.g., use one IP address for TCP and another IP address for RDMA). However, it is always not possible to have multiple IPs assigned to the same RDMA NIC. Also, one cannot always force a client information handling system to use one IP for TCP and other for RDMA.

Accordingly, presented herein are embodiments that solve the problem noted above. These embodiments allow a client information handling system to use an intended transport when using the same RDMA NIC-IP with TCP and RDMA mounts in parallel. In one or more embodiments, the client long-name and server owner major identifier value, which are used as part of the EXCHANGE_ID request and response communications, may be modified to include transport type.

B. Example Embodiments

In one or more embodiments, the transport type (e.g., TCP or RDMA) may be added to the client owner information, which is received at a NFS server, and the same transport type may also be added to the server owner identifier value. Such implements allow the server to store the client long-name string with transport type (protocol) information. Because the identifiers are different, the NFS client establishes new session for the subsequent mount attempted at the client, which thereby allows the client to use both TCP and RDMA transports as intended even if they are over the same RDMA NIC-IP.

Figure 2:
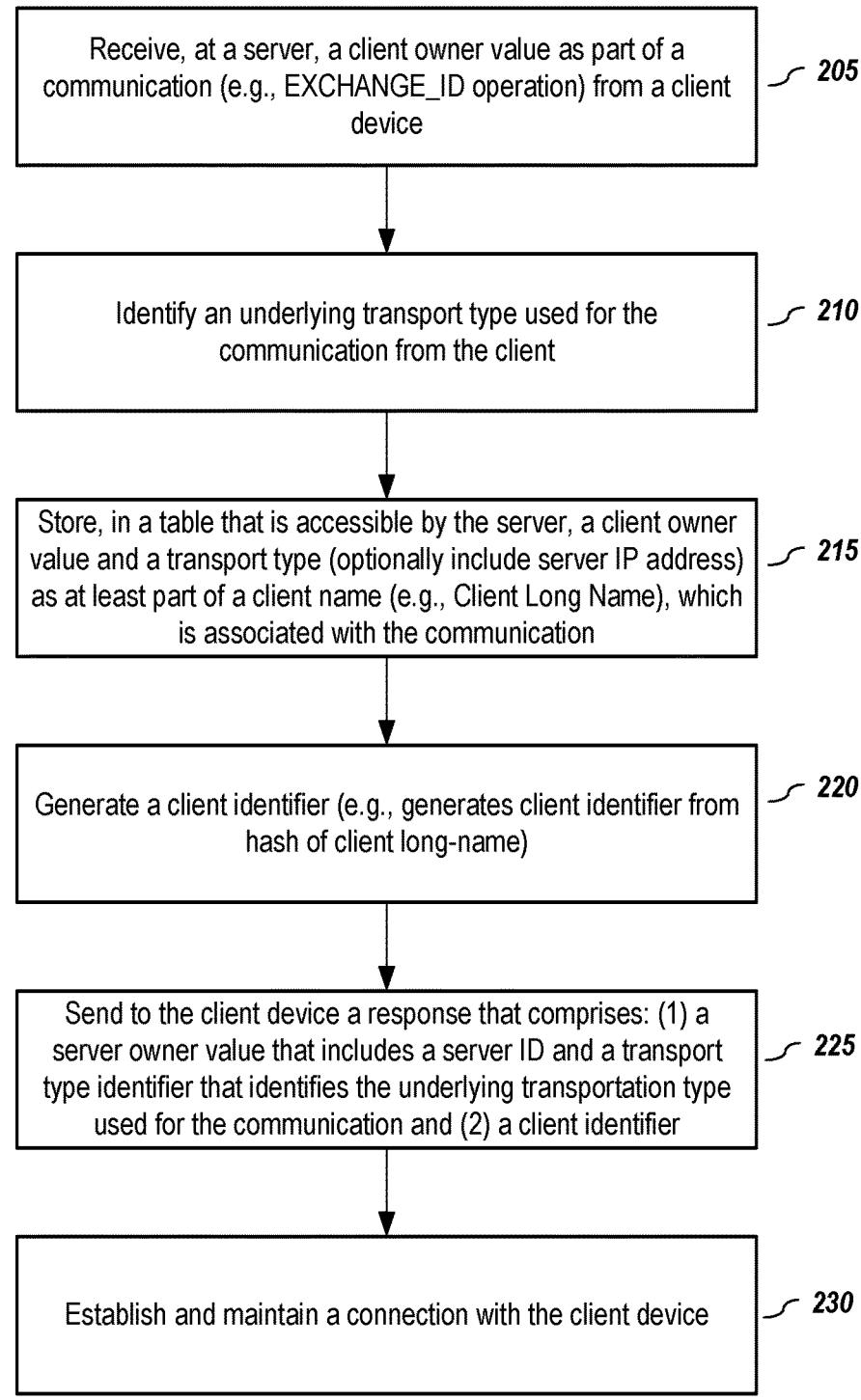
FIG. 2 depicts a methodology for mounting a network file system (NFS) share, according to embodiments of the present disclosure.

Consider the example methodology depicted in FIG. 2. In one or more embodiments, a server may perform the following processor-implemented steps. The server receives (205), from a client device (or information handling system), a client owner value as part of a communication from a client device. In one or more embodiments, the communication may part of a Network File System (NFS) protocol communication, such as an EXCHANGE_ID request. An EXCHANGE_ID operation exchanges long-hand client and server identifiers (or owners). Also involved in the exchange is a client ID, which may be generated if it does not exist. The client ID is associated with the connection on which the operation is performed, and is available when a session is created or when the connection is used to issue a request on an existing session associated with that client.

In one or more embodiments, the server identifies (210) an underlying transport type (e.g., TCP or RDMA) used for the communication from the client. Alternatively or additionally, the client device may explicitly include or send an indicator of the transportation type. The server stores (215), in a table that is accessible by the server, a client owner value and an identifier of the underlying transport type of the communication as a client name (or that form at least part of the client name as additional content may be added to form the client name), which is associated with the connection. The client owner value or client name may be of the format:

<Client-Owner>.<Transport_Type>/<Server_IP_address>

Note that this client name, which may be a client long-name, includes <Transport_Type>. In one or more embodiments, the client name may also include additional information, such as the server's IP address.

In one or more embodiments, a client identifier is obtained. In one or more embodiments, the client identifier may be obtained by the server generating (220) it. For example, the client identifier may be generated by taking a hash of the client long-name, but other means may be used for generating a unique client identifier.

In one or more embodiments, the server sends (225) to the client a response that comprises: (1) a server owner value that comprises a server identifier and a transport type identifier, and (2) the client identifier. The server owner value may be of the format:

<NodeUniqueID>.<Transport_Type>/Server_IP_address>

Note that this server owner value includes <Transport_Type> and may or not may include the server's IP address. In one or more embodiments, the <NodeUniqueID> may be a node identifier or may be a machine name (if the server is a standalone device).

Finally, a connection between the client device and the server is established or maintained (230). As discussed above, in one or more embodiments, the client identifier is used in one or more subsequent communications to correlate to the correct connection, thereby insuring that the correct connection/transport is used.

FIGS. 3A-3H graphically depicts a methodology for mounting network file system (NFS) shares of different transport types, according to embodiments of the present disclosure. Consider, by way of illustration only, that a TCP mount using NFSv4.x is being performed first.

Figure 3A:
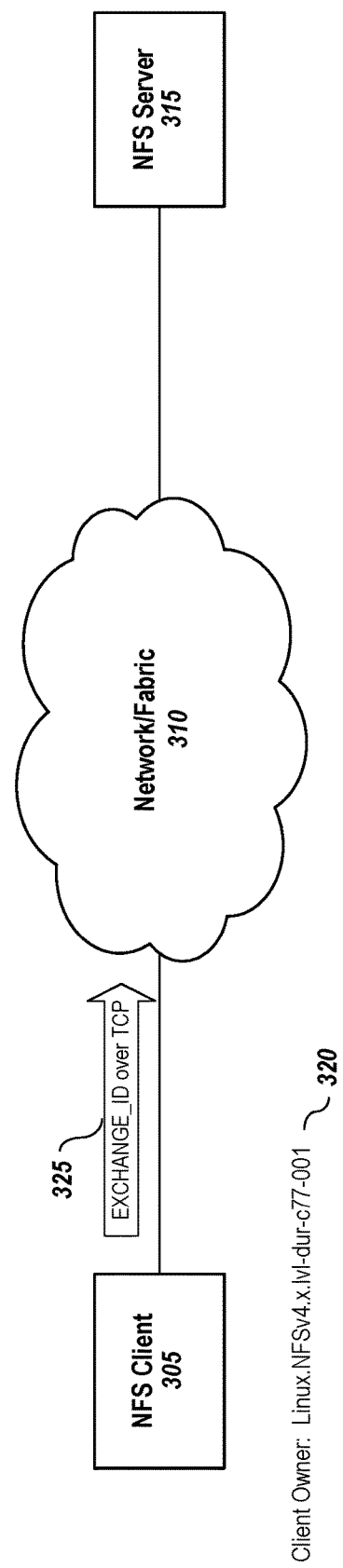
FIGS. 3A-3H graphically depicts a methodology for mounting network file system (NFS) shares of different transport types, according to embodiments of the present disclosure.

FIG. 3A illustrates a communication being sent (using TCP as the underlying protocol) from the client 305 to the server 315 via the network 310. In the depicted example, the NFSv4.x client sends a client owner value 320 as part of an EXCHANGE_ID operation 325.

Figure 3B:
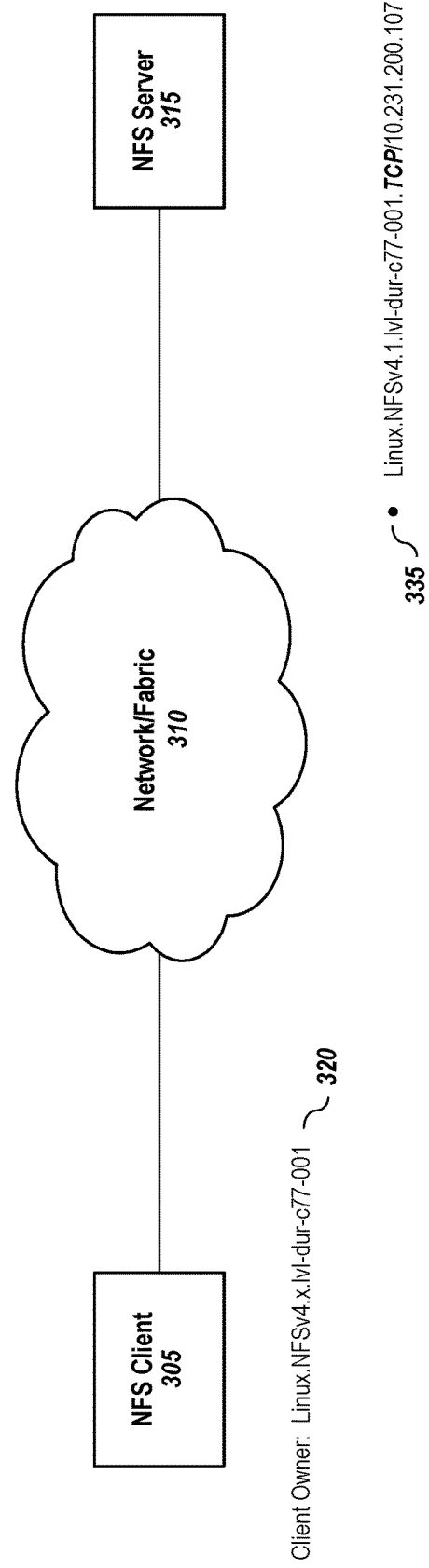

As illustrated in FIG. 3B, the NFS server 315 stores in an accessible memory the client owner information, which may be a client long name. Note that the client long name includes the transport type (in this case TCP) used in the communication/connection.

Figure 3C:
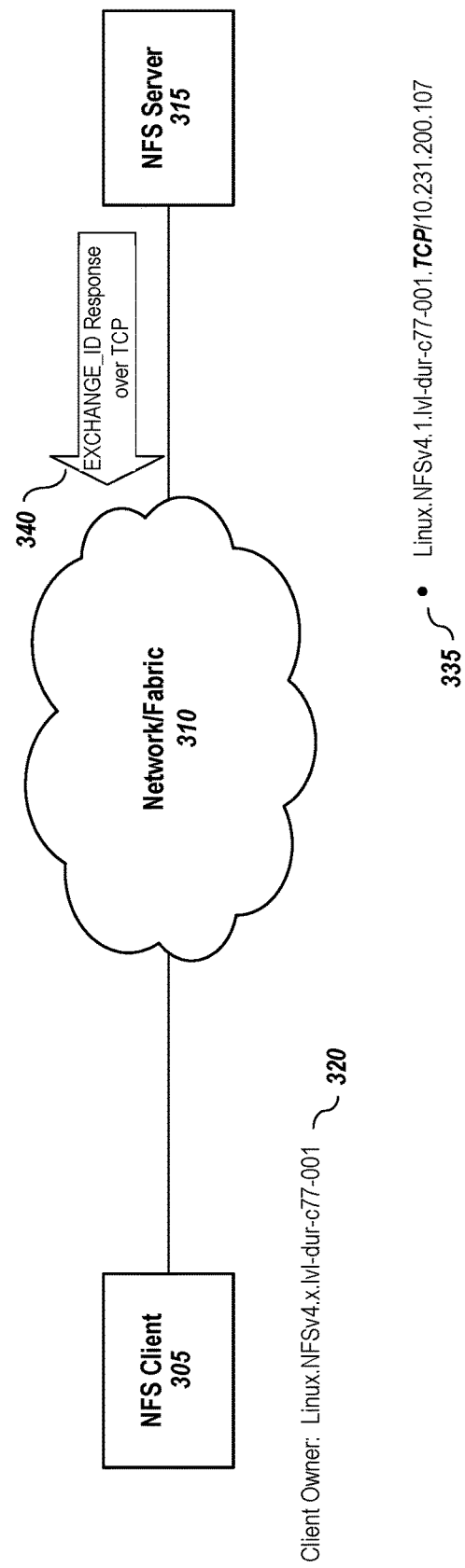
Figure 3D:
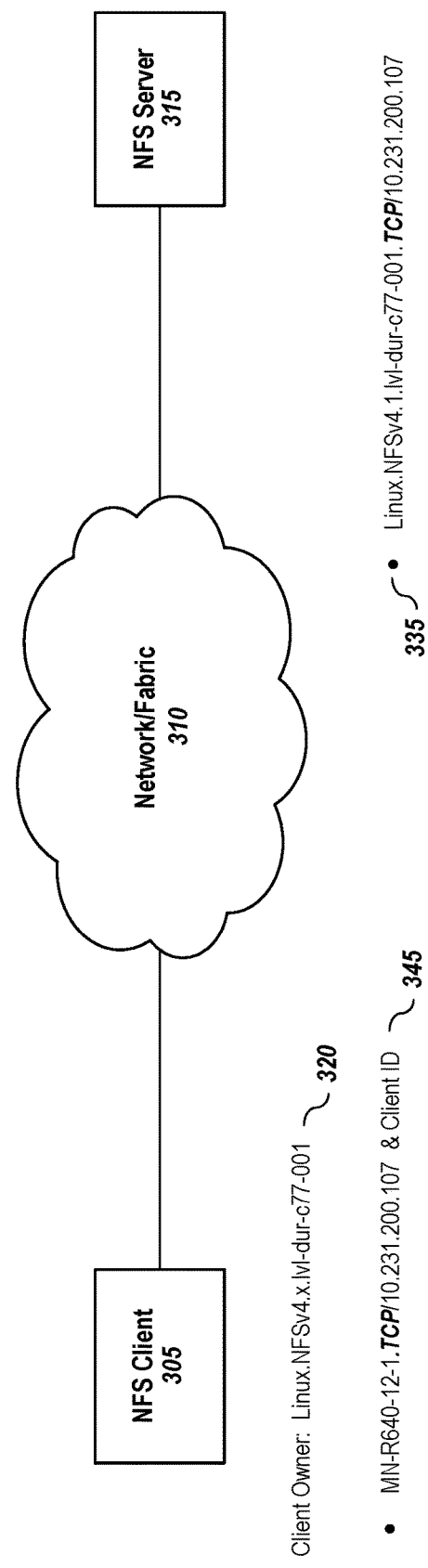
Figure 3E:
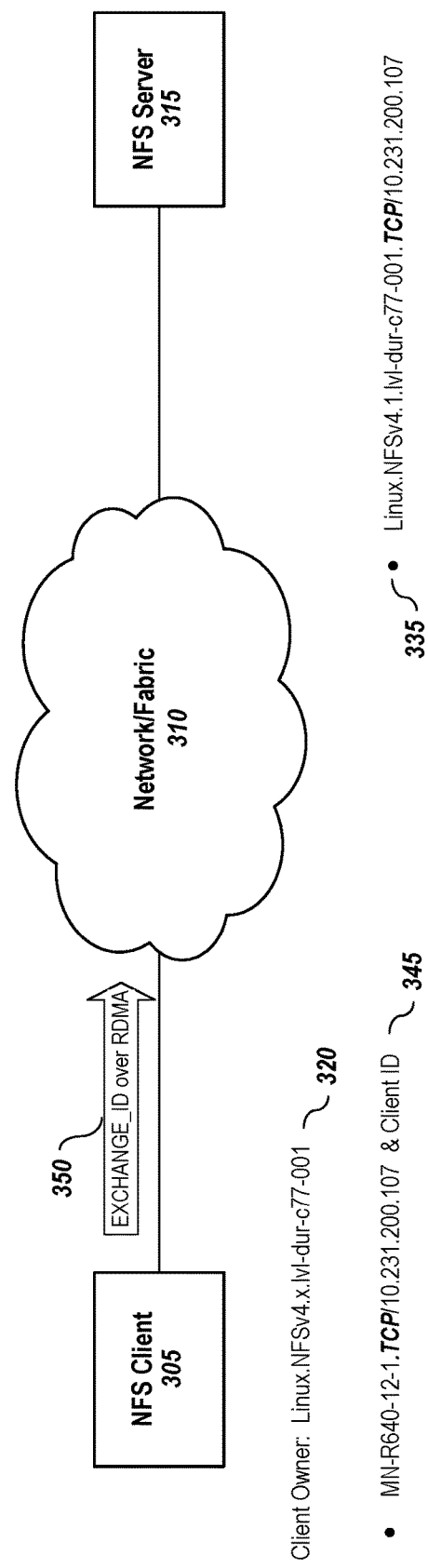

Turning next to FIGS. 3C and 3D, the NFS server 315 provides a response. In this example, the server responds to the EXCHANGE_ID request with an EXCHANGE_ID response 340 that comprises a server owner major identifier, which includes the transport type. In one or more embodiments, the response also includes a client identifier. The client stores the server owner major identifier 345 and the client identifier in an accessible memory, as illustrated in FIG. 3D.

Figure 3F:
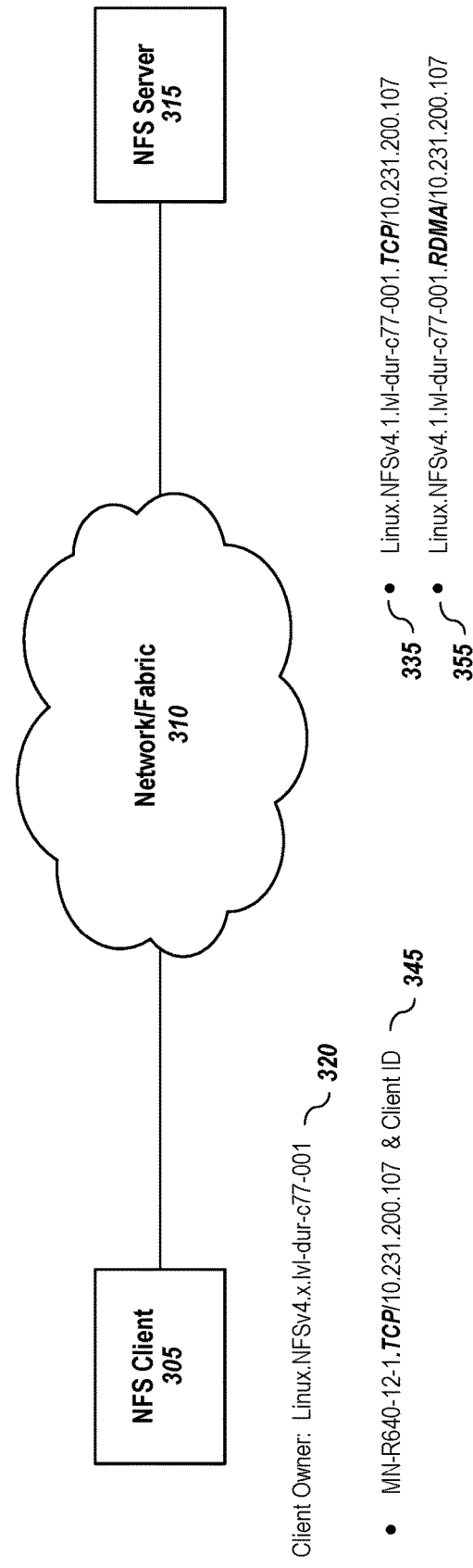

Assume, for sake of illustration, that the client 305 wants to establish an RDMA mount using the same NIC. In similar manner as discussed above, the client 305 sends a communication 350 (using RMDA as the underlying protocol), which is graphically depicted in FIG. 3E. In the depicted example, the NFSv4.x client sends the client owner value 320 as part of an EXCHANGE_ID operation 350. As illustrated in FIG. 3F, the NFS server 315 stores in an accessible memory (e.g., a table or datastore) the client owner information 355, which includes the transport type (in this case RDMA) used in the communication/connection. Note that, despite the two communications 325 and 350 originating from the same NIC on the same client, there are two distinct entries 335 and 355 at the server 315 thereby allowing the server to differentiate between the two communications that each used different protocols.

Figure 3G:
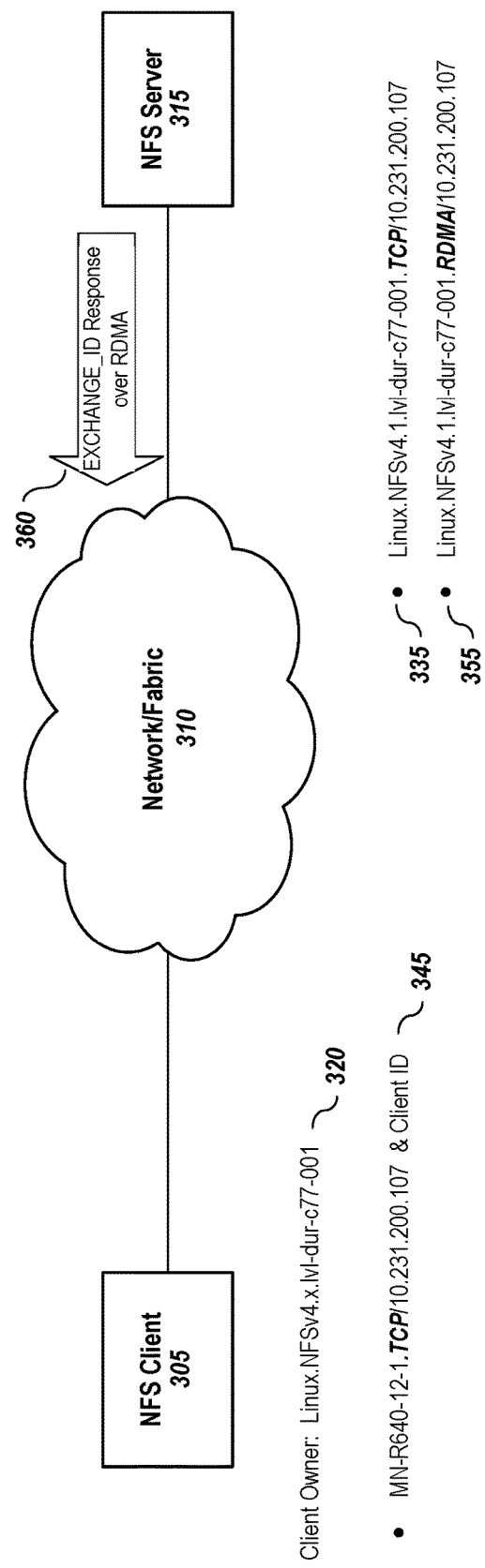
Figure 3H:
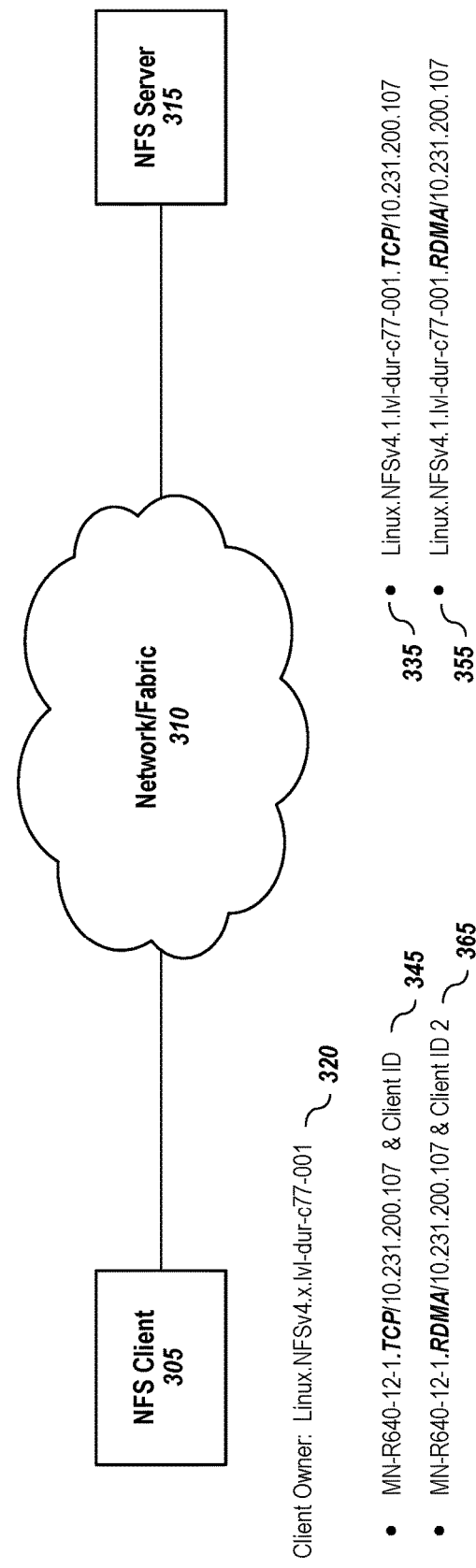

Turning next to FIGS. 3G and 3H, the NFS server 315 provides a response 360. In this example, the server responds to the EXCHANGE_ID request with an EXCHANGE_ID response 360 that comprises a server owner major identifier, which includes the transport type (RDMA in this case). In one or more embodiments, the response also includes a client identifier, which is different from the other client identifier so that it can be correlated to the underlying connection with its associated protocol. The client stores the server owner major identifier 365 and the client identifier in the accessible memory (e.g., in a table or datastore), as illustrated in FIG. 3H.

If one were to examine the mount information of the client 305, the following would be found (recall that the first mount used TCP and the subsequent mount used RDMA):

NFSv4.1 client mounts NFS share (/ifs/data/tcpdata) exported by NFS Server having RDMA NIC-IP 10.231.200.107. NFSv4.1 client mounts this share at mount-point (/tmp/smane/tcpdata) using TCP as transport protocol. root@lvl-dur-c77-001:~#mount -t nfs -o nfsvers=4.1, proto=tcp 10.231.200.107:lifsidata/tcpdata/tmp/smane/tcpdata List the mounted file systems and filter on the server IP 10.231.200.107. This shows the mount information of NFS share mounted in above command. Mount information shows details as NFS share (/ifs/data/tcpdata) exported by Server 10.231.200.107 is mounted on client at mount point/tmp/smane/tcpdata and also contains other information such as type of mount is nfs4, version 4.1, protocol used is TCP. Client and Server IP are also mentioned. root@lvl-dur-c77-001:~#mountlgrep 10.231.200.107

10.231.200.107 lifs/data/tcpdata on /tmp/smane/tcpdata type nfs4 (rw,relatime,vers=4.1,rsize=1047672, wsize=1047532,namlen=255,hard,proto=tcp,timeo=600,retrans=2,sec=sys,clientaddr=10.219.38.241,local_lock=none, addr=10.231.200.107)

Now NFSv4.1 client mounts NFS share (/ifs/data/rdmadata) exported by NFS Server having RDMA NIC-IP 10.231.200.107. NFSv4.1 client mounts this share at mount-point (/tmp/smane/rdmadata) using RDMA as transport protocol. root@lvl-dur-c77-001:~#mount -t nfs -o nfsvers=4.1, proto=rdma 10.231.200.107:/ifsidatalrdmadata/tmp/smane/rdmadata Lists the mounted file systems and filter on the server IP 10.231.200.107. This shows the mount information of NFS shares mounted in the above two mount commands. Now mount information shows two NFS shares exported by Server 10.231.200.107 which are mounted on client at mount points/tmp/smane/tcpdata and/tmp/smane/rdmadata. Also contains other information such as type of mount is nfs4, nfs version 4.1, protocol used is TCP and RDMA, respectively. Client and Server IP are also displayed in mount information.

root@lvl-dur-c77-001:~#mountlgrep 10.231.200.107

10.231.200.107 lifs/data/tcpdata on /tmp/smane/tcpdata type nfs4 (rw,relatime,vers=4.x,rsize=1047672, wsize=1047532,namlen=255,hard,proto=tcp,timeo=600,retrans=2,sec=sys,clientaddr=10.219.38.241,local_lock=none, addr=10.231.200.107)

10.231.200.107:/ifs/data/rdmadata on /tmp/smane/rdmadata type nfs4 (rw,relatime,vers=4.x,rsize=1047672, wsize=1047532,namlen=255,hard,proto=rdma,port=20049, timeo=600,retrans=2,sec=sys,clientaddr=10.219.38.241, local_lock=none,addr=10.231.200.107)

This information shows that the depicts embodiment allows an NFS client to mount using TCP and RDMA transport in parallel, targeting the same RDMA NIC. Thus, embodiments allow for both RoCE (RDMA over Converged Ethernet) and TCP being mounted concurrently in converged fabrics where one may want to have both RDMA and non-RDMA traffic converged. It shall be noted that, in one or more embodiments, supporting such functionality may be accomplished by adding functionality to the server as disclosed herein but that the client can remain unchanged—such implementations are efficient as there are fewer servers relative to clients and servers tend to be controlled by one or few entities but clients are typically owned and/or controlled by a vast number of entities, which makes altering or updating the clients to support such a feature challenging.

Figure 4:
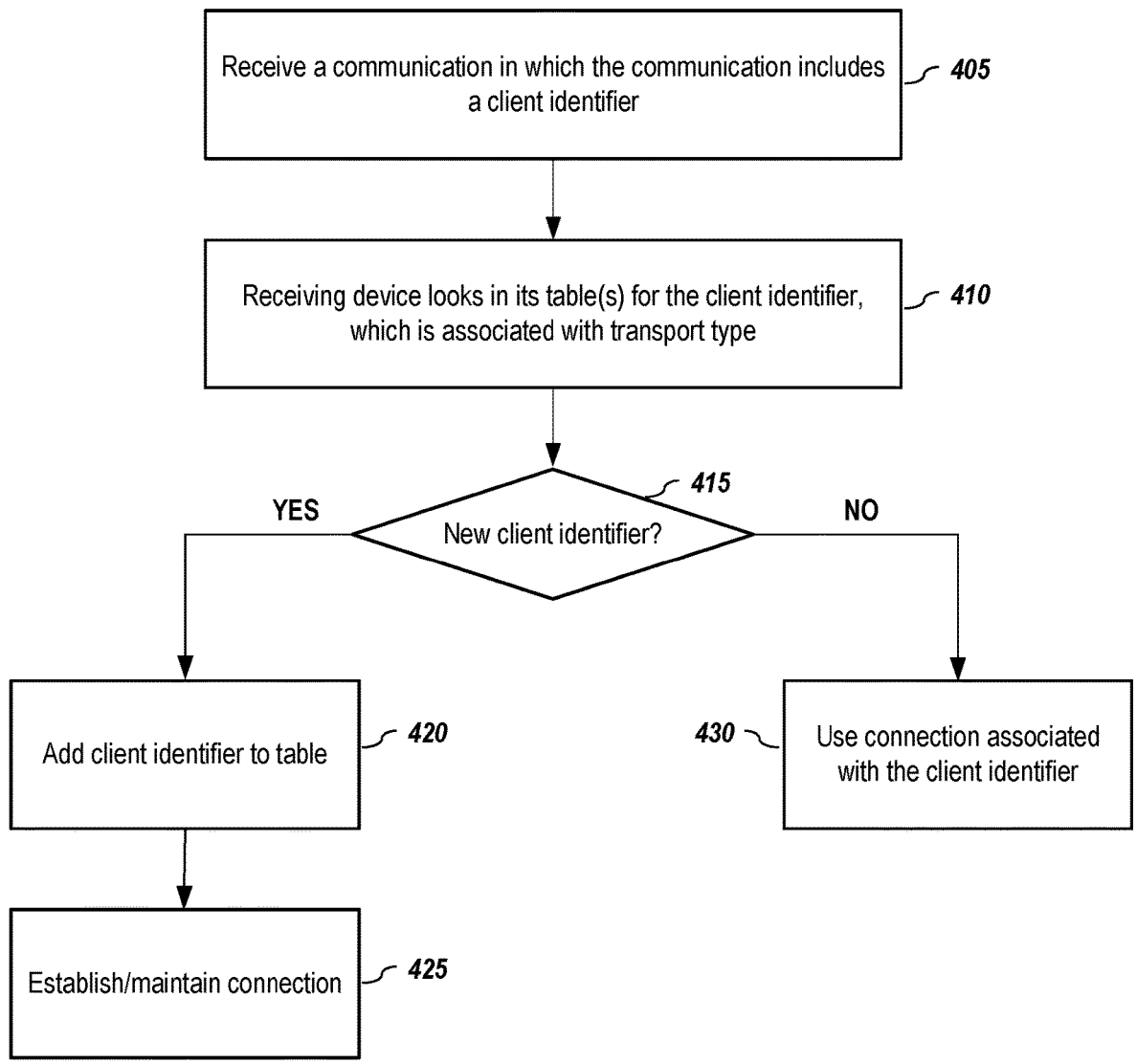
FIG. 4 depicts a methodology using a connection, according to embodiments of the present disclosure.

FIG. 4 depicts a methodology using a connection, according to embodiments of the present disclosure. An entity (client device) receives (405) a communication in which the communication includes a client identifier and server owner value. The receiving device queries (410) its in-memory NFS client list for the client identifier and server owner major ID, which is associated with transport type. Responsive to the client identifier being a new client identifier or new server owner major ID, the receiving device adds (420) the new NFS client identifier and server owner major ID to its in-memory NFS client list as new entry. And, in one or more embodiments, a connection between the receiving device and the sending device may be established or maintained. Responsive to the client identifier being stored in a memory, the receiving device may use the connection associated with the client identifier to communicate with the sending devices.

For example, in one or more embodiments, for a server information handling system, responsive to receiving an additional communication from a client information handling system that includes a client identifier, the server information handling system uses the included client identifier to correlate the additional communication to a correct protocol for use when responding to the additional communication.

C. System Embodiments

In one or more embodiments, aspects of the present patent document may be directed to, may include, or may be implemented on one or more information handling systems (or computing systems). An information handling system/computing system may include any instrumentality or aggregate of instrumentalities operable to compute, calculate, determine, classify, process, transmit, receive, retrieve, originate, route, switch, store, display, communicate, manifest, detect, record, reproduce, handle, or utilize any form of information, intelligence, or data. For example, a computing system may be or may include a personal computer (e.g., laptop), tablet computer, mobile device (e.g., personal digital assistant (PDA), smart phone, phablet, tablet, etc.), smart watch, server (e.g., blade server or rack server), a network storage device, camera, or any other suitable device and may vary in size, shape, performance, functionality, and price.

The computing system may include random access memory (RAM), one or more processing resources such as a central processing unit (CPU) or hardware or software control logic, read only memory (ROM), and/or other types of memory. Additional components of the computing system may include one or more drives (e.g., hard disk drives, solid state drive, or both), one or more network ports for communicating with external devices as well as various input and output (I/O) devices. The computing system may also include one or more buses operable to transmit communications between the various hardware components.

Figure 5:
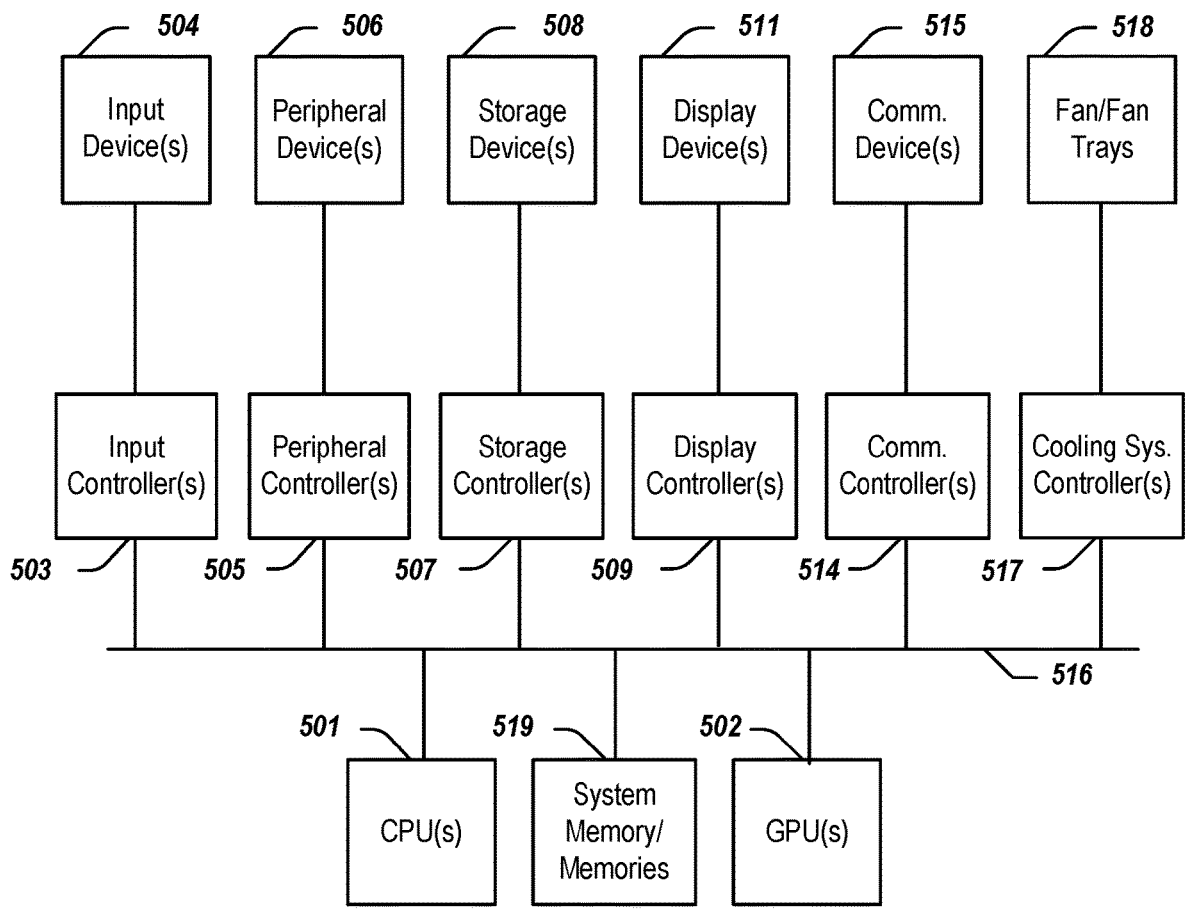
FIG. 5 depicts a simplified block diagram of an information handling system, according to embodiments of the present disclosure.

FIG. 5 depicts a simplified block diagram of an information handling system (or computing system), according to embodiments of the present disclosure. It will be understood that the functionalities shown for system 500 may operate to support various embodiments of a computing system—although it shall be understood that a computing system may be differently configured and include different components, including having fewer or more components as depicted in FIG. 5.

As illustrated in FIG. 5, the computing system 500 includes one or more CPUs 501 that provides computing resources and controls the computer. CPU 501 may be implemented with a microprocessor or the like and may also include one or more graphics processing units (GPU) 502 and/or a floating-point coprocessor for mathematical computations. In one or more embodiments, one or more GPUs 502 may be incorporated within the display controller 509, such as part of a graphics card or cards. The system 500 may also include a system memory 519, which may comprise RAM, ROM, or both.

A number of controllers and peripheral devices may also be provided, as shown in FIG. 5. An input controller 503 represents an interface to various input device(s) 504, such as a keyboard, mouse, touchscreen, stylus, microphone, camera, trackpad, display, etc. The computing system 500 may also include a storage controller 507 for interfacing with one or more storage devices 508 each of which includes a storage medium such as magnetic tape or disk, or an optical medium that might be used to record programs of instructions for operating systems, utilities, and applications, which may include embodiments of programs that implement various aspects of the present disclosure. Storage device(s) 508 may also be used to store processed data or data to be processed in accordance with the disclosure. The system 500 may also include a display controller 509 for providing an interface to a display device 511, which may be a cathode ray tube (CRT) display, a thin film transistor (TFT) display, organic light-emitting diode, electroluminescent panel, plasma panel, or any other type of display. The computing system 500 may also include one or more peripheral controllers or interfaces 505 for one or more peripherals 506. Examples of peripherals may include one or more printers, scanners, input devices, output devices, sensors, and the like. A communications controller 514 may interface with one or more communication devices 515, which enables the system 500 to connect to remote devices through any of a variety of networks including the Internet, a cloud resource (e.g., an Ethernet cloud, a Fibre Channel over Ethernet (FCoE)/Data Center Bridging (DCB) cloud, etc.), a local area network (LAN), a wide area network (WAN), a storage area network (SAN) or through any suitable electromagnetic carrier signals including infrared signals. As shown in the depicted embodiment, the computing system 500 comprises one or more fans or fan trays 518 and a cooling subsystem controller or controllers 517 that monitors thermal temperature(s) of the system 500 (or components thereof) and operates the fans/fan trays 518 to help regulate the temperature.

In the illustrated system, all major system components may connect to a bus 516, which may represent more than one physical bus. However, various system components may or may not be in physical proximity to one another. For example, input data and/or output data may be remotely transmitted from one physical location to another. In addition, programs that implement various aspects of the disclosure may be accessed from a remote location (e.g., a server) over a network. Such data and/or programs may be conveyed through any of a variety of machine-readable media including, for example: magnetic media such as hard disks, floppy disks, and magnetic tape; optical media such as compact discs (CDs) and holographic devices; magneto-optical media; and hardware devices that are specially configured to store or to store and execute program code, such as application specific integrated circuits (ASICs), programmable logic devices (PLDs), flash memory devices, other non-volatile memory (NVM) devices (such as 3D XPoint-based devices), and ROM and RAM devices.

Figure 6:
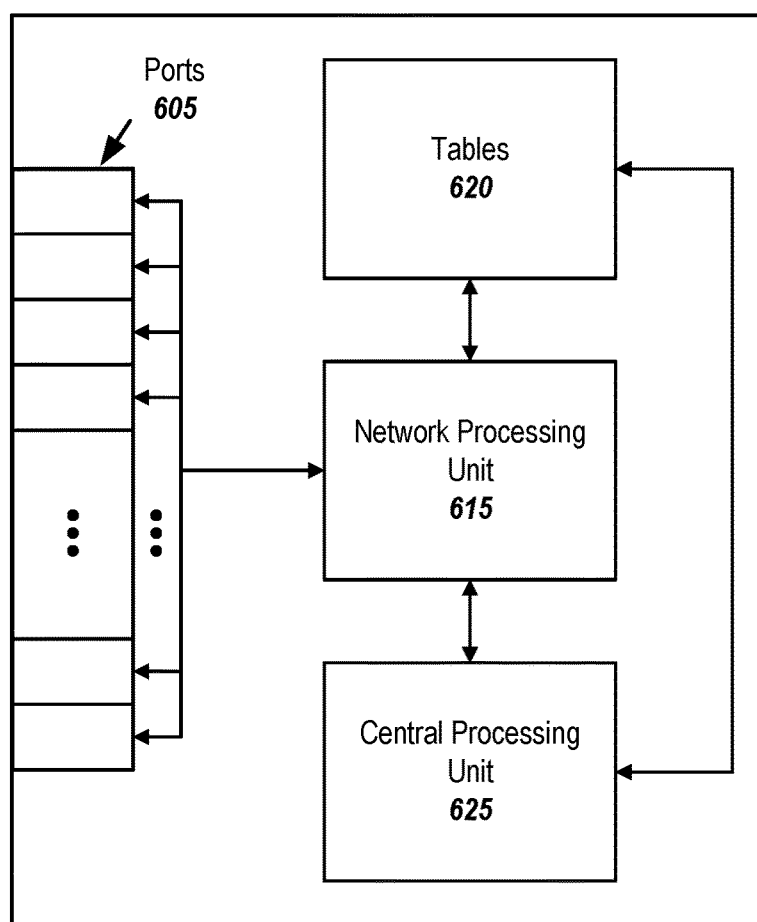
FIG. 6 depicts an alternative block diagram of an information handling system, according to embodiments of the present disclosure.

FIG. 6 depicts an alternative block diagram of an information handling system, according to embodiments of the present disclosure. It will be understood that the functionalities shown for system 600 may operate to support various embodiments of the present disclosure—although it shall be understood that such system may be differently configured and include different components, additional components, or fewer components.

The information handling system 600 may include a plurality of I/O ports 605, a network processing unit (NPU) 615, one or more tables 620, and a CPU 625. The system includes a power supply (not shown) and may also include other components, which are not shown for sake of simplicity.

In one or more embodiments, the I/O ports 605 may be connected via one or more cables to one or more other network devices or clients. The network processing unit 615 may use information included in the network data received at the node 600, as well as information stored in the tables 620, to identify a next device for the network data, among other possible activities. In one or more embodiments, a switching fabric may then schedule the network data for propagation through the node to an egress port for transmission to the next destination.

Aspects of the present disclosure may be encoded upon one or more non-transitory computer-readable media with instructions for one or more processors or processing units to cause steps to be performed. It shall be noted that the one or more non-transitory computer-readable media shall include volatile and/or non-volatile memory. It shall be noted that alternative implementations are possible, including a hardware implementation or a software/hardware implementation. Hardware-implemented functions may be realized using ASIC(s), programmable arrays, digital signal processing circuitry, or the like. Accordingly, the "means" terms in any claims are intended to cover both software and hardware implementations. Similarly, the term "computer-readable medium or media" as used herein includes software and/or hardware having a program of instructions embodied thereon, or a combination thereof. With these implementation alternatives in mind, it is to be understood that the figures and accompanying description provide the functional information one skilled in the art would require to write program code (i.e., software) and/or to fabricate circuits (i.e., hardware) to perform the processing required.

It shall be noted that embodiments of the present disclosure may further relate to computer products with a non-transitory, tangible computer-readable medium that have computer code thereon for performing various computer-implemented operations. The media and computer code may be those specially designed and constructed for the purposes of the present disclosure, or they may be of the kind known or available to those having skill in the relevant arts. Examples of tangible computer-readable media include, for example: magnetic media such as hard disks, floppy disks, and magnetic tape; optical media such as compact discs (CDs) and holographic devices; magneto-optical media; and hardware devices that are specially configured to store or to store and execute program code, such as ASICs, PLDs, flash memory devices, other non-volatile memory devices (such as 3D XPoint-based devices), ROM, and RAM devices. Examples of computer code include machine code, such as produced by a compiler, and files containing higher level code that are executed by a computer using an interpreter. Embodiments of the present disclosure may be implemented in whole or in part as machine-executable instructions that may be in program modules that are executed by a processing device. Examples of program modules include libraries, programs, routines, objects, components, and data structures. In distributed computing environments, program modules may be physically located in settings that are local, remote, or both.

One skilled in the art will recognize no computing system or programming language is critical to the practice of the present disclosure. One skilled in the art will also recognize that a number of the elements described above may be physically and/or functionally separated into modules and/or sub-modules or combined together.

It will be appreciated to those skilled in the art that the preceding examples and embodiments are exemplary and not limiting to the scope of the present disclosure. It is intended that all permutations, enhancements, equivalents, combinations, and improvements thereto that are apparent to those skilled in the art upon a reading of the specification and a study of the drawings are included within the true spirit and scope of the present disclosure. It shall also be noted that elements of any claims may be arranged differently including having multiple dependencies, configurations, and combinations.

What is claimed is:

1. A processor-implemented method comprising:
   receiving, at a server information handling system, a client owner value as part of a communication from a client information handling system;
   identifying an underlying transport type used for the communication from the client information handling system;
   storing, in a memory that is accessible by the server information handling system, a client name associated with the communication and its underlying transport type;
   sending to the client information handling system one or more responses that comprise: (1) a server owner value that comprises a server identifier and a transport type identifier that identifies the underlying transport type used for the communication, and (2) a client identifier; and
   establishing or maintaining a connection with the client information handling system.

2. The processor-implemented method of claim 1 wherein the communication is part of a Network File System (NFS) protocol communication.

3. The processor-implemented method of claim 2 wherein the communication from the client information handling system is an exchange identifier operation.

4. The processor-implemented method of claim 1 further comprising:
   generating the client identifier.

5. The processor-implemented method of claim 4 wherein generating the client identifier comprises:
   using the client name or a variant thereof in generating the client identifier.

6. The processor-implemented method of claim 1 wherein:
   the client name comprises the client owner value and a transport type identifier that identifies the underlying transport type used for the communication.

7. The processor-implemented method of claim 1 wherein:
   the stored client owner value and transport also include an internet protocol address of the server information handling system.

8. The processor-implemented method of claim 1 wherein:
   responsive to receiving a subsequent communication, using the client identifier to correlate the subsequent communication to a correct protocol for use when responding to the subsequent communication.

9. The processor-implemented method of claim 1 wherein:
   responsive to receiving a subsequent communication from the client information handling system via a same network interface card but using a different protocol, performing steps comprising:
   identifying an underlying transport type used for the subsequent communication from the client information handling system;
   storing, in the memory that is accessible by the server information handling system, a client name associated with the subsequent communication that differentiates the underlying transport type used for the subsequent communication from the underlying transport type used for the communication; and
   sending to the client information handling system one or more responses that comprise: (1) a server owner value that comprises a server identifier and a transport type identifier that identifies the underlying transport type used for the subsequent communication, and (2) a client identifier.

10. An information handling system comprising:
    one or more processors; and
    a non-transitory computer-readable medium or media comprising one or more sets of instructions which, when executed by at least one of the one or more processors, causes steps to be performed comprising:
    receiving, at the information handling system, a client owner value as part of a communication from a client information handling system;
    identifying an underlying transport type used for the communication from the client information handling system;
    storing, in a memory that is accessible by the information handling system, a client name associated with the communication and its underlying transport type;
    sending to the client information handling system one or more responses that comprise: (1) an information handling system owner value that comprises an information handling system identifier and a transport type identifier that identifies the underlying transport type used for the communication, and (2) a client identifier; and establishing or maintaining a connection with the client information handling system.

11. The information handling system of claim 10 wherein the communication is part of a Network File System (NFS) protocol communication.

12. The information handling system of claim 10 wherein the non-transitory computer-readable medium or media further comprises one or more sequences of instructions which, when executed by at least one of the one or more processors, causes steps to be performed comprising:

generating the client identifier.

13. The information handling system of claim 10 wherein:

the client name comprises the client owner value and a transport type identifier that identifies the underlying transport type used for the communication.

14. The information handling system of claim 10 wherein:

the stored client owner value and transport also include an internet protocol address of the information handling system.

15. The information handling system of claim 10 wherein the non-transitory computer-readable medium or media further comprises one or more sequences of instructions which, when executed by at least one of the one or more processors, causes steps to be performed comprising:

responsive to receiving a subsequent communication, using the client identifier to correlate the subsequent communication to a correct protocol for use when responding to the subsequent communication.

16. The information handling system of claim 10 wherein the non-transitory computer-readable medium or media further comprises one or more sequences of instructions which, when executed by at least one of the one or more processors, causes steps to be performed comprising:

responsive to receiving a subsequent communication from the client information handling system via a same network interface card but using a different protocol, performing steps comprising:

identifying an underlying transport type used for the subsequent communication from the client information handling system;

storing, in the memory that is accessible by the information handling system, a client name associated with the subsequent communication that differentiates the underlying transport type used for the subsequent communication from the underlying transport type used for the communication; and sending to the client information handling system one or more responses that comprise: (1) an information handling system owner value that comprises an information handling system identifier and a transport type identifier that identifies the underlying transport type used for the subsequent communication, and (2) a client identifier.

17. A non-transitory computer-readable medium or media comprising one or more sequences of instructions which, when executed by at least one processor, causes steps to be performed comprising:

receiving, at a server information handling system, a client owner value as part of a communication from a client information handling system;

identifying an underlying transport type used for the communication from the client information handling system;

storing, in a memory that is accessible by the server information handling system, a client name associated with the communication and its underlying transport type;

sending to the client information handling system one or more responses that comprise: (1) a server owner value that comprises a server identifier and a transport type identifier that identifies the underlying transport type used for the communication, and (2) a first client identifier; and establishing or maintaining a connection with the client information handling system.

18. The non-transitory computer-readable medium or media of claim 17 wherein:

the stored client owner value and transport also include an internet protocol address of the server information handling system.

19. The non-transitory computer-readable medium or media of claim 17 further comprising one or more sequences of instructions which, when executed by at least one of the one or more processors, causes steps to be performed comprising:

responsive to receiving a subsequent communication from the client information handling system via a same network interface card but using a different protocol, performing steps comprising:

identifying an underlying transport type used for the subsequent communication from the client information handling system;

storing, in the memory that is accessible by the server information handling system, a client name associated with the subsequent communication that differentiates the underlying transport type used for the subsequent communication from the underlying transport type used for the communication; and sending to the client information handling system one or more responses that comprise: (1) a server owner value that comprises a server identifier and a transport type identifier that identifies the underlying transport type used for the subsequent communication, and (2) a second client identifier.

20. The non-transitory computer-readable medium or media further of claim 19 further comprising one or more sequences of instructions which, when executed by at least one of the one or more processors, causes steps to be performed comprising:

responsive to receiving an additional communication that includes either the first client identifier or the second client identifier, using the included client identifier to correlate the additional communication to a correct protocol for use when responding to the additional communication.

* * * * *